(12) United States Patent
Clawson et al.

(10) Patent No.: US 11,838,404 B2
(45) Date of Patent: Dec. 5, 2023

(54) BLOCK CHAIN MODIFICATION CORRELATION

(71) Applicant: PROFITSTANCE, INC., Provo, UT (US)

(72) Inventors: James Winston Clawson, Vineyard, UT (US); Gwyllum Corey Blaser, Provo, UT (US)

(73) Assignee: PROFITSTANCE, INC., Provo, UT (US)

( * ) Notice: Subject to any disclaimer, the term of this patent is extended or adjusted under 35 U.S.C. 154(b) by 236 days.

(21) Appl. No.: 16/663,797

(22) Filed: Oct. 25, 2019

(65) Prior Publication Data

US 2020/0136805 A1    Apr. 30, 2020

Related U.S. Application Data

(60) Provisional application No. 62/750,773, filed on Oct. 25, 2018.

(51) Int. Cl.
*H04L 9/06* (2006.01)
*H04L 9/00* (2022.01)

(52) U.S. Cl.
CPC .......... *H04L 9/0637* (2013.01); *H04L 9/0643* (2013.01); *H04L 9/50* (2022.05)

(58) Field of Classification Search
CPC .............. H04L 2209/38; H04L 9/0637; H04L 9/0643; H04L 2209/56; H04L 9/3239; G06F 21/64; G06Q 20/02; G06Q 20/065; G06Q 20/36; G06Q 2220/00; G06Q 10/0833; G06Q 40/12
See application file for complete search history.

(56) References Cited

U.S. PATENT DOCUMENTS

2016/0071108 A1\*  3/2016  Caldera .............. G06Q 20/4016
                                                      705/75
2019/0164150 A1\*  5/2019  Lee ....................... G06Q 20/363

\* cited by examiner

*Primary Examiner* — Olugbenga O Idowu
(74) *Attorney, Agent, or Firm* — Maschoff Brennan

(57) ABSTRACT

A method may include obtaining first and second sets of block chain modifications from first and second exchange servers, respectively. The method may additionally include parsing the sets of block chain modifications to identify attributes associated with a first block chain modification included in the first set of block chain modifications, and automatically correlating the first block chain modification with a second block chain modification included in the second set of block chain modifications as corresponding components of an exchange associated with the first user. The method may additionally include flagging both the first and second block chain modifications based on the automatic correlation, and generating a report of the sets of block chain modifications that excludes the flagged block chain modifications.

17 Claims, 8 Drawing Sheets

BLOCK CHAIN MODIFICATION CORRELATION

CROSS-REFERENCE TO RELATED APPLICATION

This application claims priority to U.S. Provisional Patent Application No. 62/750,773, filed on Oct. 25, 2018, the disclosure of which is incorporated herein by reference in its entirety.

FIELD

Embodiments of the present disclosure relate to block chain modification correlation.

BACKGROUND

In addition to other functionality provided by block chain architectures, block chains have been used as a public view of data exchanges between entities, linking and/or encrypting each block based on the previous block and information regarding the data exchange. However, because of the anonymous nature of certain block chain modifications it can be difficult to determine what entities are involved in block chain modifications.

SUMMARY

One or more embodiments of the present disclosure may include a method that includes obtaining a first set of block chain modifications related to a first user from a first digital asset exchange server, where at least portions of the first set of block chain modifications accessible via credentials of the first user. The method may also include obtaining a second set of block chain modifications related to the first user from a second digital asset exchange server, where at least portions of the second set of block chain modifications accessible via the credentials of the first user. The method may additionally include parsing the first set of block chain modifications and the second set of block chain modifications to identify attributes associated with a first block chain modification included in the first set of block chain modifications. The method may also include automatically correlating the first block chain modification with a second block chain modification included in the second set of block chain modifications as corresponding components of an exchange involving the first digital asset exchange and the second digital asset exchange associated with the first user based on the attributes of at least the first block chain modification. The method may additionally include flagging both the first block chain modification and the second block chain modification based on the automatic correlation, and generating a report of the first set of block chain modifications and the second set of block chain modifications that excludes the first block chain modification and the second block chain modification based on the first block chain modification and the second block chain modification being flagged as both being associated with the exchange associated with the first user.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1:
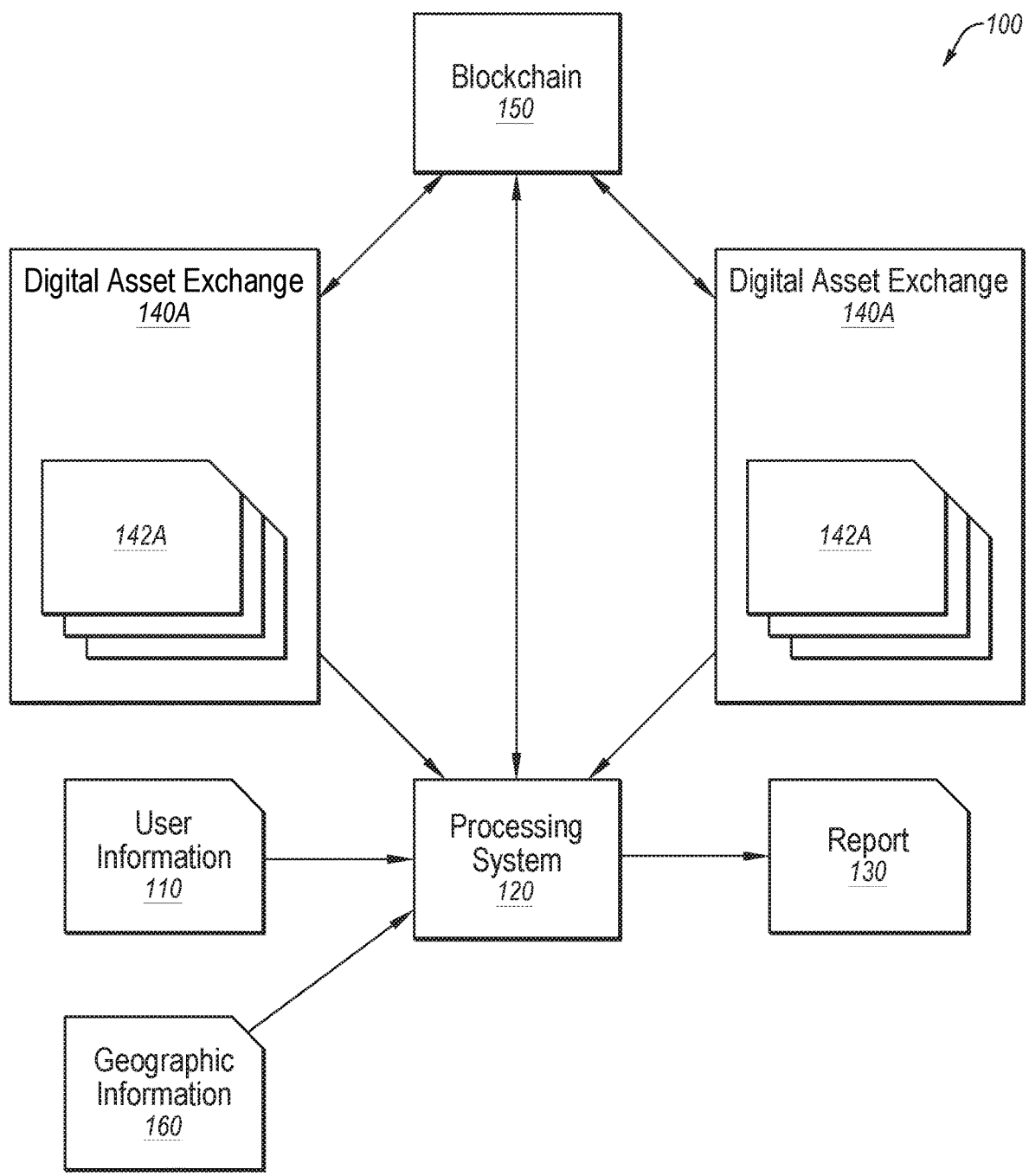
FIG. 1 is a diagram illustrating an example environment within which block chain modifications may be correlated.

The present disclosure relates to correlating block chain modifications. Currently, records of block chain modifications are stored in sets that may be accessed with proper credentials. However, representations of these block chain modifications are incredibly difficult to follow and analyze, including for computers. The various digital asset exchanges that store such records may use different and inconsistent data labels, fields, or other approaches to maintain records of the block chain modifications. Such inconsistency makes it very difficult to correlate block chain modifications such that both ends of a data exchange may be identified, let alone correlated to identify responsible parties or entities.

The present disclosure relates to obtaining various sets of block chain modifications and normalizing metadata or other data fields associated with the block chain modifications such that the block chain modifications may be analyzed in a consistent manner. Using the sets of block chain modifications, incoming and outgoing data exchanges block chain modifications of a same or similar quantity and date (which may include time) may be identified. In some embodiments, a predictive model may be used to provide a probability that a pair of block chain modifications may be correlated as the two opposite parts of a single exchange represented by the block chain modifications. Additionally or alternatively, two such block chain modifications may be automatically correlated. The correlated block chain modifications may be flagged as such, and may be excluded from certain reports or other analyses.

The present disclosure also includes the generation of group data objects that include incoming and outgoing block chain modifications that are associated based on quantity and a data allocation procedure. For example, based on the data allocation procedure (which may be geographically based), certain block chain modifications may be selected as covering other block chain modifications. Furthermore, partial quantities of block chain modifications may be utilized during the generation of such group data objects. In certain circumstances, the correlated block chain modifications may be excluded from the generation of group data objects of the block chain modifications.

In some circumstances, embodiments of the present disclosure may facilitate improvement in the performance of a computer by applying the teachings of the present disclosure. For example, by providing correlation of both ends of a block chain modification the entity responsible for the block chain modification may be identified. Furthermore, the ownership of various block chain modifications through a series of block chain modifications may be traced and identified in a manner that was previously unavailable. Such an improvement provides for proper accountability for certain obligations.

As another example, many digital asset exchange servers use different styles and systems to represent block chain modifications in records kept of block chain modifications. The differences in styles and systems makes the process for correlating block chain modifications not only difficult, but exceptionally error prone. For example, one digital asset exchange server may label outgoing block chain modifications as credits, while another may label them as deposits, and another may incorrectly label them as negative quantity values. By using embodiments of the present disclosure, the scattered data types may be streamlined in a manner that both incoming and outgoing block chain modifications may be analyzed in a consistent manner such that they can be correlated in a reliable and consistent way. Furthermore, such an approach and system is currently not available.

One or more example embodiments are explained with reference to the accompanying drawings.

FIG. 1 is a diagram illustrating an example environment 100 within which block chain modifications may be correlated, in accordance with one or more embodiments of the present disclosure. As illustrated in FIG. 1, a variety of types and locations of data and/or information may be obtained by a processing system 120. The processing system 120 may correlate various block chain modifications, generate group data objects, and/or perform other processing on the various types of data and/or information. In some embodiments, the processing system 120 may generate a report 130. The information utilized by the processing system 120 may include user information 110 (such as credentials for accessing a digital asset exchange 140, identifying ownership of a record of a set of block chain modifications 142, or other information related to a particular user), information from digital asset exchanges 140 (including the records of sets of block chain modifications 142), information from a block chain 150, geographic information 160, and/or any other sources of data.

In operation, a user may provide user information 110 (such as credentials for accessing a digital asset exchange 140, identifying ownership of a record of a set of block chain modifications 142, or other information related to a particular user) via which the user and/or the processing system 120 may obtain information from digital asset exchanges 140 and/or a block chain 150. For example, the user may access the digital asset exchange 140a using their credentials and indicate that the user is the owner of a record 142a of a set of block chain modifications associated with the digital asset exchange 140a. In response, the digital asset exchange 140a may provide the record 142a to the processing system 120.

In these and other embodiments, the record 142a may be obtained by the processing system 120 in multiple ways. For example, the user may access the digital asset exchange 140a and may download or otherwise retrieve a representation of the block chain modifications within the record 142a (e.g., as a comma-separated value (.csv) file or other machine-readable format). As another example, the user may access the digital asset exchange 140a and may invoke a user interface control that may automatically convey the data from the record 142a to the processing system 120. For example, such a user interface control may invoke an application programming interface (API) of the processing system 120 such that the digital asset exchange 140a may interface directly with the processing system 120 to provide the data (e.g., push the data from the digital asset exchange 140a to the processing system 120 via an API of the processing system 120). As a further example, the user may access the processing system 120 and may utilize an API or other feature within the processing system 120 via which the processing system 120 may access or otherwise pull the information from the digital asset exchange 140a. In some embodiments, after an initial approval has been provided by the user, the record 142a may be periodically obtained by the processing system 120. While described with reference to the record 142a and the digital asset exchange 140a, the record 142b may be obtained from the digital asset exchange 140b (and/or any other number of digital asset exchanges) in a similar or comparable manner.

The digital asset exchange 140 may include any entity, system, etc. that may store records 142 of block chain modifications. In some embodiments, the digital asset exchange 140 may include a currency exchange or market for a particular type or types of cryptocurrency, such as Coinbase, Kraken, etc., and may operate in any number of cryptocurrencies such as Bitcoin, Ethereum, Litecoin, etc. In some embodiments, the digital asset exchanges 140 may process exchanges of assets, such as cryptocurrency, by posting such transactions to the block chain 150. For example, when the digital asset exchange 140a performs a data exchange with the digital asset exchange 140b, the exchange may be posted to the block chain 150 such that the exchange is recorded and verifiable and unmodifiable after the fact. In some embodiments, the digital asset exchange 140 may perform such an exchange with an entity aside from another digital asset exchange 140, such as another entity, an individual, etc. In some embodiments, the digital asset exchange 140 may perform an exchange to different records 142 within the digital asset exchange 140. In these and other embodiments, the exchange may appear in the record 142 without actually posting to the block chain 150 (e.g., may be processed on a ledger or other internal exchange service within the digital asset exchange 140), but still may be referred to as a block chain modification for the purposes of the present disclosure.

The block chain 150 may include a public record that is built upon the previous entries and is hosted and/or validated by multiple computing systems such that entries on the block chain 150 are trustworthy. In these and other embodiments, the block chain 150 may record exchanges of cryptocurrency or other digital assets among and/or between individuals, digital asset exchanges 140, and/or individual records of sets of block chain modifications (whether individually hosted or by a custodial service that hosts and/or monitors individual records of sets of block chain modifications).

The record 142 may include any grouping or set of block chain modifications associated with the user. For example, the record 142 may correspond to a digital wallet of the user. Each individual block chain modification within the record 142 may include data as organized by the digital asset exchange 140 with which it is associated. For example, the record 142a may include a set of data fields for each block chain modification as organized and/or directed by the digital asset exchange 140. For example, the data fields may include a quantity (e.g., an amount in a cryptocurrency), a direction (e.g., incoming, outgoing), a type (e.g., send, receive, debit, credit, buy, sell, deposit, withdrawal, fee, etc.), an originator, a recipient, a date, a fee (e.g., a fixed quantity, a percentage, a variable quantity), an exchange value (e.g., the value of an asset to other currency according to the digital asset exchange 140 at a given time), etc. As used herein, the term "date" may include a given temporal point, and may include time. For example, a given date may include a day, month, year, hour, minute, second, millisecond, etc. In some embodiments, the record 142 may include exchanges from within the digital asset exchange 140a, e.g., from the record 142a to another record stored within the digital asset exchange 140a, or even two block chain modifications within the same record 142a. In these and other embodiments, such information may still be accessible to the processing system 120 although such an exchange may not appear on the block chain 150.

In some embodiments, the processing system 120 may utilize the record 142a to generate a set of data objects specific to the digital asset exchange 140a (e.g., the digital asset exchange 140a from which the record 142a was obtained) to represent various block chain modifications within the record 142a. Such an exchange-specific data object may include each of the fields as designated by the digital asset exchange 140.

In some embodiments, the processing system 120 may create a sub-object within the exchange-specific data object that may include a unified set of data fields that may be comparable across different digital asset exchanges 140 when representing block chain modifications. For example, different digital asset exchanges 140 may use different fields, may use different labels within those fields, etc. The sub-object may include fields such as a quantity, a fee quantity, total quantity without the fee, and a cost basis or amount realized based on variations in value in the digital asset associated with a given block chain modification. In some embodiments, the common sub-object quantities may be stored in multiple formats, such as a native currency, a common value representation, an asset quantity, etc.

In some embodiments, factors contributing to the quantities, cost basis, etc. may be based on data obtained from the digital asset exchanges 140. For example, the processing system 120 may periodically access published rates of exchange from the digital asset exchanges 140 to compile exchange rates at specific points in time, and/or prices of various digital assets at various points in time. Additionally or alternatively, the processing system 120 may generate a database of exchange values for various points in time. For example, the processing system 120 may gather exchange rates across and between various assets multiple times per day such that a rolling database of exchange rates may be obtained for any given point in time. In some embodiments, such information may be obtained from compiling data fields from block chain modifications. For example, a given block chain modification in the record 142a may be performed at a given date, and the metadata of the given block chain modification may include the exchange rate according to the associated digital asset exchange 140a at the given date. By compiling such information across many digital asset exchanges 140 and block chain modifications, the exchange rates may be obtained.

In some embodiments, when collecting data regarding block chain modifications associated with a given user, the processing system 120 may predict that a certain set of block chain modifications (e.g., a further record 142) may be associated with the given user. For example, if multiple block chain modifications include an identifier associated with another user, the processing system 120 may query the given user to suggest the other user may actually be the given user. Additionally or alternatively, machine learning algorithms or other intelligent approaches may be used to monitor for patterns in block chain modifications associated with a single user such that suggestions may be made of additional sets of block chain modifications being associated with the given user based on the machine learning observed patterns. In some embodiments, such monitored data leading to predicted sets of block chain modifications may be from any number of digital asset exchanges and/or users, and is not limited to data specifically from the given user. Based on providing a predicted set of block chain modifications, the given user may confirm the prediction by accessing the digital asset exchange associated with the suggested set of block chain modifications to provide credentials to validate that the given user is in fact associated with the suggested set of block chain modifications. By doing so, the processing system 120 may associate the given user with the set of block chain modifications. In some embodiments a single pair of block chain modifications may be enough to suggest another set of block chain modifications may be associated with the user, and the probability may increase as additional data is observed. For example, if the single pair of block chain modifications would be automatically correlated (e.g., same date, same type, same quantity but opposite direction (potentially offset by a fee amount), etc.), a relationship between the two sets of block chain modifications to which the individual block chain modifications belong may be predicted.

In some embodiments, a user may be able to request information or data from an owner of an identified potentially correlated block chain modification. For example, if a first user is the owner of an incoming block chain modification and a correlated outgoing second block chain modification associated with a second user is identified by the processing system 120, the first user may request access to certain data regarding the outgoing block chain modification, such as cost basis, original acquisition date of a corresponding asset, transaction type, etc. Such a request may be performed while keeping the second user completely anonymous from the first user (e.g., a user interface may include an alert that matching data may be available with an option to request permission for the additional data). Upon invoking the request, the processing system 120 may communicate with the second user without the first user knowing the identity of the second user. Upon approval by the second user, the metadata of the incoming block chain modification may be modified to include the obtained data. This may be particularly useful if the incoming block chain modification includes a donation, a gift, etc. for which certain obligations may be imposed that are dependent on the data held by the second user.

After obtaining various sets of block chain modifications as associated with a given user, the processing system 120 may perform various processing tasks on the block chain modifications associated with the given user. Such processing may include correlation of two distinct block chain modifications as being opposite ends of the same transaction for the same user and/or a different user. For example, the processing system 120 may search for block chain modifications of a same or similar quantity (which may include a same or similar value of asset involved in the block chain modification) at the same or a similar date and may automatically correlate such block chain modifications. An example implementation of such correlation may be described with greater detail in FIG. 6.

Another example of processing that may be performed by the processing system 120 includes generating group data objects that groups incoming and outgoing block chain modifications. For example, a certain outgoing block chain modification may be grouped with one or more incoming block chain modifications. An example implementation of such group data object generation may be described with greater detail in FIG. 7.

In some embodiments, the processing performed by the processing system 120 may be based in part on geographic information 160. For example, the geographic information 160 may include region-specific rules affecting which block chain modifications may be correlated as described in FIG. 6 and which block chain modifications are to be included in a group data object as described in FIG. 7. For example, in some regions block chain modifications across cryptocurrencies (e.g., from Bitcoin to Ethereum) may be included as two correlated block chain modifications while in other regions, block chain modifications across cryptocurrencies may be excluded from correlation.

In some embodiments, based on the processing performed by the processing system 120, a report 130 may be generated. Such a report 130 may include various pieces of information as determined or generated by the processing system 120. For example, the report 130 may include a set of correlated block chain modifications as described in FIG. 6, or may include all block chain modifications except those correlated as described in FIG. 6. As another example, the report 130 may include a set of suggested block chain modifications with which a given user may be associated. As a further example, the report 130 may include an amount earned or gained over time as the value of the digital asset changed. As another example, the report 130 may include a taxable liability for the sets of block chain modifications associated with the user.

Modifications, additions, or omissions may be made to the environment 100 without departing from the scope of the disclosure. For example, the designations of different elements in the manner described is meant to help explain concepts described herein and is not limiting. Further, the environment 100 may include any number of other elements or may be implemented within other systems or contexts than those described. For example, any number of digital asset exchanges 140 may be included in the environment 100.

Figure 2:
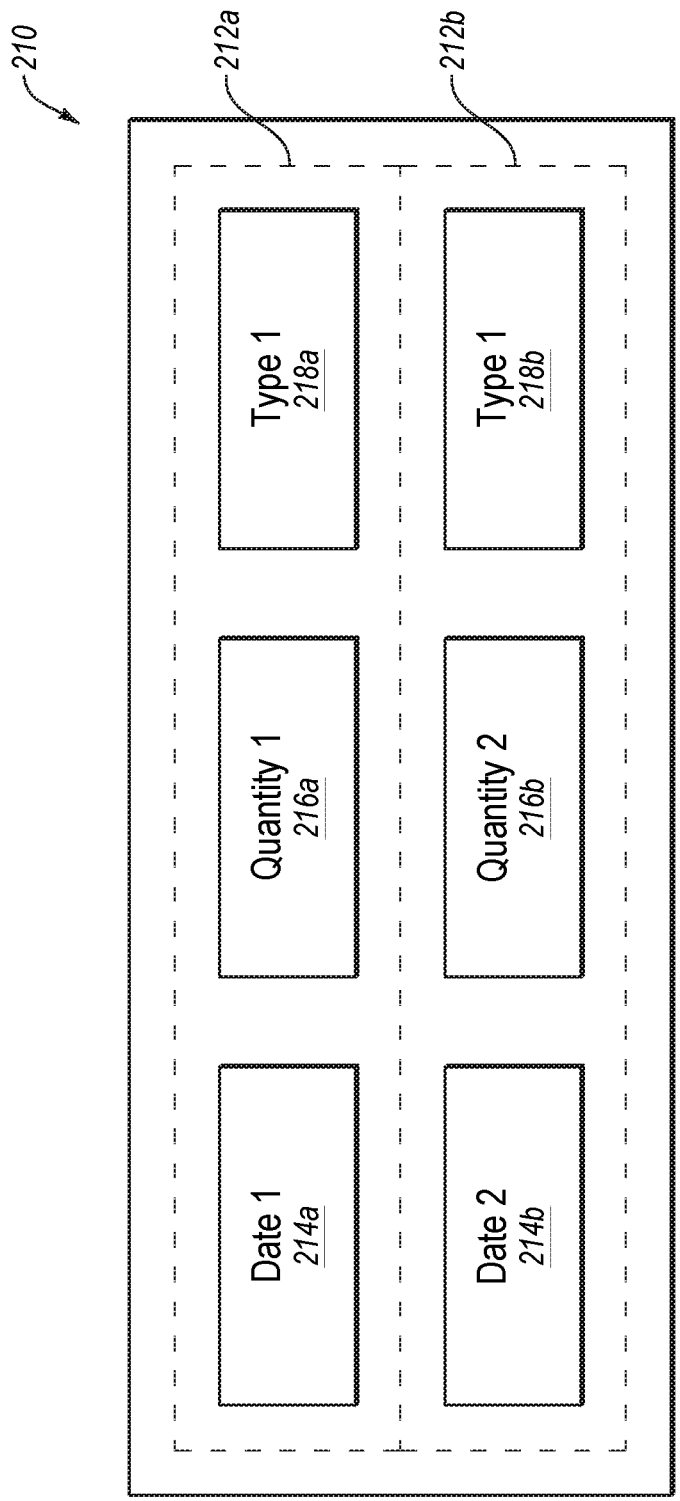
FIG. 2 is a block diagram of example correlated block chain modifications.

FIG. 2 is a block diagram of an example of correlated block chain modifications 210, in accordance with one or more embodiments of the present disclosure. As illustrated in FIG. 2, the correlated block chain modifications 210 may include a first block chain modification 212a and a second block chain modification 212b. The first block chain modification 212a may include a date 214a, a quantity 216a (which may include an amount of currency of a given cryptocurrency or any other quantity), and a type 218a. The second block chain modification 212b may include a date 214b, a quantity 216b, and a type 218b. In some embodiments, the first and second block chain modifications 212a/212b may be correlated based on similarities between the date, quantity and/or type. In these and other embodiments, the block chain modifications may be correlated to identify pairs of block chain modifications that are non-taxable events based on geographical information for a particular region. For example, in the United States, if an asset of Bitcoin is transferred from one wallet to another wallet of Bitcoin, the exchange is considered a non-taxable event.

After correlating the first block chain modification 212a and the second block chain modification 212b, a processing system (such as the processing system 120 of FIG. 1) may create a data object that correlates the first block chain modification 212a and the second block chain modification 212b. Such data object may include a flag such that the block chain modifications 212 may be handled in a distinct manner, such as by excluding them from a report.

In some embodiments, the correlated block chain modifications 210 may include additional data regarding the block chain modifications 212a/212b, or may include pointers to other records/data of the block chain modifications 212a/212b. For example, the correlated block chain modifications 210 may be correlated based on the date 214 and the quantity 216, but may additionally include information from any of the other data fields as described in the present disclosure. In some embodiments, the correlated block chain modifications 210 may be correlated based on any combination of data fields associated with the block chain modifications 212a and 212b.

While illustrated as entire block chain modifications 212a and 212b, in some embodiments, either or both of the block chain modifications 212a and/or 212b may be only portions of an exchange of assets. For example, if a given outgoing block chain modification includes an outgoing quantity of 1.3 units in one cryptocurrency, and the corresponding incoming block chain modifications include a first quantity of 0.6 units in the same cryptocurrency and the remainder being put in a fiat currency wallet (e.g., transferred to United States Dollars (USD)), the correlated block chain modifications may include only the first quantity of 0.6 units of the cryptocurrency (e.g., 0.6 units are flagged as a being correlated). In these and other embodiments, the processing system is able to handle fractional pieces of the block chain modifications. As another example, an outgoing transaction may be deducted by a quantity corresponding to a fee such that the quantities may be different. In these and other embodiments, based on the type of correlated block chain modifications, the correlated block chain modifications may be treated differently. For example, correlated block chain modifications that are associated with sets of block chain modifications owned by the same user may be treated one way, while correlated block chain modifications that are associated with sets of block chain modifications sets of block chain modifications owned by different users or entities may be treated another.

In some embodiments, the quantity of a given block chain modification may vary over time. For example, if the quantity is used in terms of a corresponding base value in a native currency (e.g., USD), the quantity may vary over time. Additionally or alternatively, the corresponding value of the quantity of a block chain modification may vary over time while the quantity itself remains (e.g., a block chain modification may correspond to 0.2 units of cryptocurrency, that may have a corresponding value of $35.001 USD at one point in time and $37.025 USD at another point in time).

Modifications, additions, or omissions may be made to the correlated block chain modifications 210 without departing from the scope of the disclosure. For example, the correlated block chain modifications 210 may include any number of other elements or may be implemented within other systems or contexts than those described. For example, any number of data fields may be included with the correlated block chain modifications 210.

Figure 3:
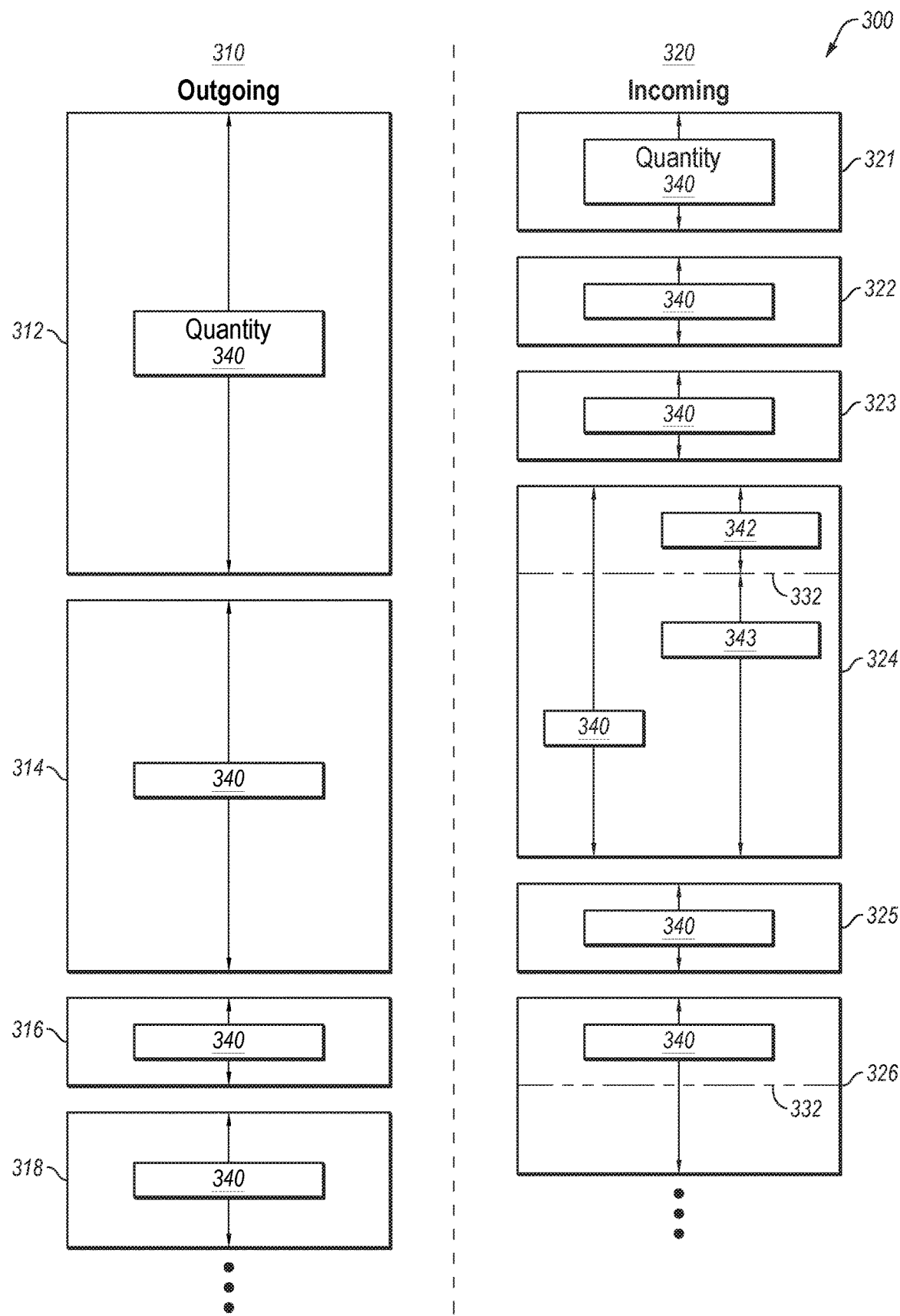
FIG. 3 is an example block diagram of associations between and among various incoming and/or outgoing block chain modifications.

FIG. 3 is an example block diagram 300 of associations between and among various incoming and/or outgoing block chain modifications 310/320 when generating a group data object, in accordance with one or more embodiments of the present disclosure. As illustrated in FIG. 3, a series of outgoing block chain modifications 310 are illustrated in one column, including block chain modifications 312, 314, 316, and 318. A series of incoming block chain modifications 320 are illustrated in another column, including block chain modifications 321, 322, 323, 324, 325, and 326. A processing system (such as the processing system 120 of FIG. 1), may associate one or more of the outgoing block chain modifications 310 with the incoming block chain modifications 320 to create a group data object representing the association.

In some embodiments, the outgoing block chain modification 312 may have a quantity 340 that is to be mapped to one or more incoming block chain modifications 320 based on their corresponding quantities 340. In these and other embodiments, the quantity 340 may vary over time. For example, the quantity 340 of the block chain modification 312 may correspond to a given value of the block chain modification 312 at a given date, such as when processed, when posted to the block chain, etc. In some embodiments, the quantity 340 may include multiple values, such as a quantity in native currency (e.g., $5.00 USD), a quantity of common value representation (e.g., $5.00 USD, if the processing system uses USD as the common value), an asset quantity (e.g., 0.0451 Bitcoin), etc. In these and other embodiments, the quantity 340 may be tied to a date, such as when the block chain modification 312 is performed and/or a current date. In these and other embodiments, the processing system may pull values to determine the quantity 340 based on a stored database of current and/or historical exchange rates or may pull exchange rates in real time or when the generation of group data objects is performed.

In some embodiments, the ordering of the outgoing and/or incoming block chain modifications 310/320 may be based on geographical information. For example, in some regions, a first-in, first-out (FIFO) data allocation procedure may be used. In these and other embodiments, both the outgoing and incoming block chain modifications 310/320 may be ordered from oldest to newest. As another example, in some regions, a first-in, last-out (FILO) data allocation procedure may be used. In these and other embodiments, the outgoing block chain modifications 310 may be ordered from oldest to newest and the incoming block chain modifications 320 may be ordered from newest to oldest.

As illustrated in FIG. 3, the incoming block chain modification 321, 322, and 323, and a portion of the incoming block chain modification 324 (e.g., the quantity 342 above the separator 332) may be associated with the outgoing block chain modification 323 based on the quantities 340 of the block chain modification 321, 322, and 323 and the quantity 342 of the incoming block chain modification 324 above the separator 332 corresponding to the quantity 340 of the outgoing block chain modification 312. In these and other embodiments, metadata of each of the block chain modifications 312, 321, 322, 323, and 324 may be included in a group data object. In these and other embodiments, the metadata of the block chain modification 324 may be adjusted to represent that only the quantity 342 of the block chain modification 324 is in the group data object with the block chain modification 312, with the quantity 343 below the separator 332 remaining.

Using the group data object, the processing system may be able to determine a tax liability associated with block chain modification 312. For example, a quantity 340 of the block chain modification 321 may be obtained from metadata from the block chain modification 321 (e.g., based on a direct data field of the block chain modification 321 or based on a date of the block chain modification 321 and a corresponding exchange rate at that date as determined by the processing system). Based on a difference in the quantity, the transition from the incoming block chain modification 321 to the outgoing block chain modification 312 may be characterized as a gain or a loss, and may be characterized as short term or long term based on the difference in dates between the incoming block chain modification 321 and the outgoing block chain modification 312. The same may be done for each of the block chain modifications 322, 323, and the quantity 342 of the block chain modification 324.

The same group data objects may be generated for the outgoing block chain modification 314 with the incoming block chain modifications 325 and the quantity 343 below the separator 332 of the block chain modification 324, and may also be generated for the outgoing block chain modification 316 with a portion of the incoming block chain modification 326.

Modifications, additions, or omissions may be made to the diagram 300 without departing from the scope of the disclosure. For example, the diagram 300 may include any number of other elements or may be implemented within other systems or contexts than those described. For example, any number of outgoing and/or incoming block chain modifications 310/320 may be included with the diagram 300.

Figure 4:
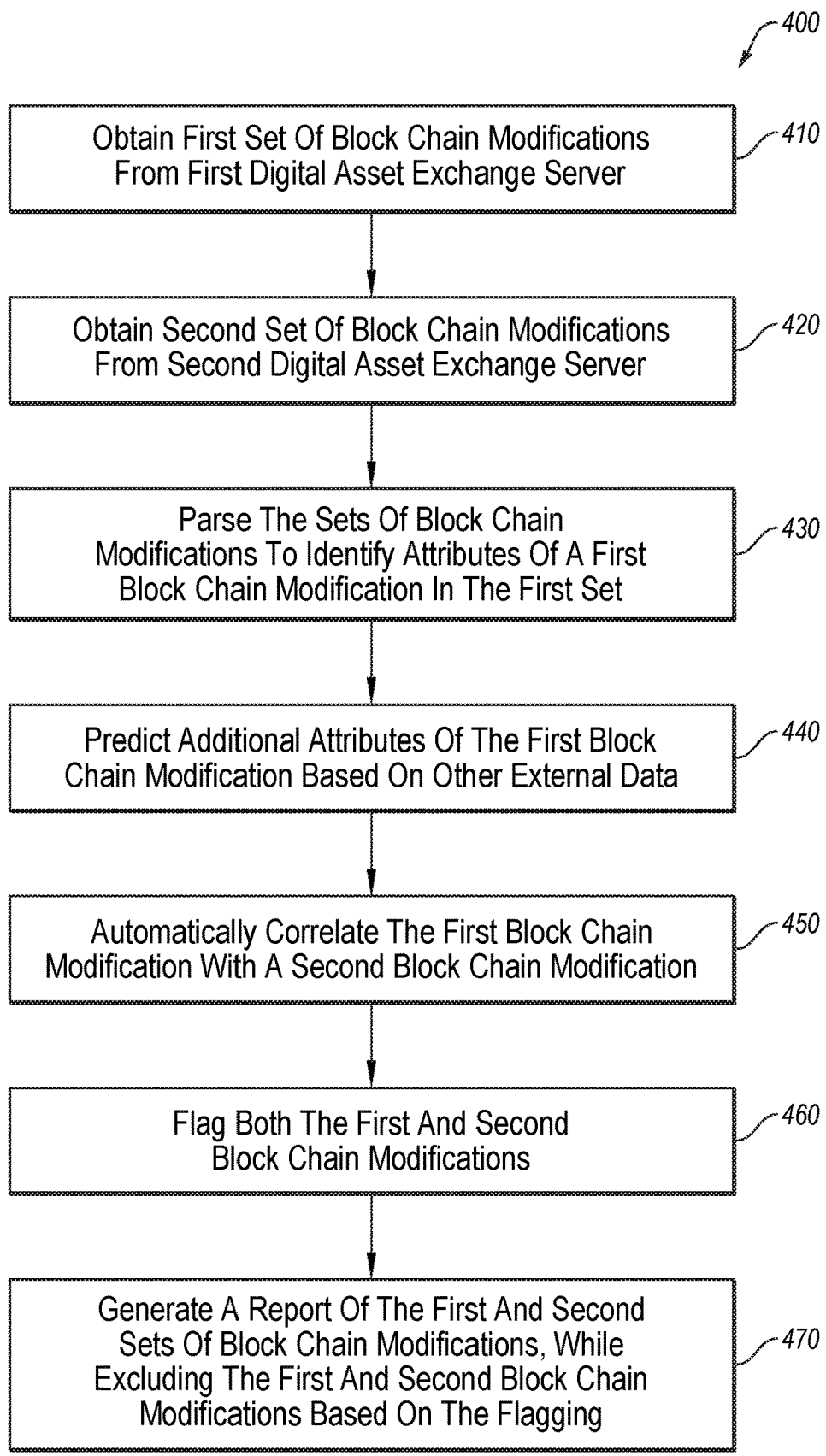
FIG. 4 illustrates an example flowchart of an example method of block chain modification correlation.

FIG. 4 illustrates an example flowchart of an example method 400 of block chain modification correlation, in accordance with one or more embodiments of the present disclosure. One or more operations of the method 400 may be performed by a system or device, or combinations thereof, such as the processing system 120 of FIG. 1 and/or the computing system 800 of FIG. 8. Although illustrated as discrete blocks, various blocks of the method 400 may be divided into additional blocks, combined into fewer blocks, or eliminated, depending on the desired implementation.

At block 410, a first set of block chain modifications may be obtained from a first digital asset exchange server. For example, a processing system (such as the processing system 120 of FIG. 1) may obtain the first set of block chain modifications. In some embodiments, a user associated with the first set of block chain modifications (e.g., an owner of a digital wallet), may upload a machine-readable file with information regarding the first set of block chain modifications (e.g., all the exchanges in to and/or out of the digital wallet). As another example, the user may provide credentials to a digital asset exchange hosting or otherwise storing a record of the first set of block chain modifications such that the processing system may access data regarding the first set of block chain modifications. In some embodiments, the first set of block chain modifications may be predicted as being owned by or otherwise associated with the user. In these and other embodiments, the first set of block chain modifications may be obtained based on the user providing credentials to the first digital asset exchange to validate the prediction and the first digital asset exchange providing the first set of block chain modifications to the processing system.

At block 420, a second set of block chain modifications may be obtained from a second digital asset exchange server. The block 420 may be similar or comparable to the block 410, but performed for the second set of block chain modifications hosted or otherwise stored by the second digital asset exchange server.

At block 430, the first and the second sets of block chain modifications may be parsed to identify attributes of a first block chain modification in the first set of block chain modifications. For example, the first digital asset exchange may have a set of data fields associated with block chain modifications and the first set of block chain modifications may be parsed to identify such fields and may be used to populate a data object specific to the first digital asset exchange. Additionally or alternatively, the first set of block chain modifications may be parsed to identify data fields that correspond to a common data object that is used by the processing system in such a way that data fields across different digital asset exchanges may be used in a consistent manner.

At block 440, additional attributes of the first block chain modification may be predicted based on other external data. For example, by analyzing sets of block chain modifications from other digital asset exchange servers and/or sets of block chain modifications associated with different users, additional attributes may be observed. Such data may include historical data (e.g., data collected by the processing system for previous block chain modifications). For example, the digital asset exchange servers may be inconsistent in how different block chain modifications are labeled or categorized, and/or may include errors when doing so (e.g., an outgoing block chain modification may be labeled as a credit for a digital asset exchange server). As another example, patterns of block chain modifications may be observed to generate exchange rates or currency values such that an exchange rate and/or an associated value may be predicted based on the observed block chain modifications. In some embodiments, such a prediction may include predicting fees or potential fees for a given digital asset exchange. For example, correlations or predicted correlations of pairs of block chain modifications may include a pair of block chain modifications that are off by a certain quantity. Based on a repeated pattern of being approved, the potential fee may be reliably predicated for a given digital asset exchange such that the corresponding fee may be utilized to predict other correlations, to supplement attributes of given block chain modifications, etc. As a further example, a pattern of block chain modifications may be predicated as being associated with a user.

At block 450, the first block chain modification may be automatically correlated with a second block chain modification. For example, based on a date, a quantity, and/or a type of the first block chain modification and the second block chain modification being similar (with the quantity being similar but opposite), the first and second block chain modifications may be correlated.

At block 460, the first and second block chain modifications may be flagged based on the automatic correlation. For example, based on the automatic correlation, the first and second block chain modifications may be considered as opposite ends of a transaction in which the user has transferred a digital asset from one set of block chain modifications (e.g., a digital wallet) to another. Based on geographic information (e.g., if in a jurisdiction in which transferring a cryptocurrency from one wallet to another), the flag may indicate that the first and second block chain modifications may be excluded from taxable events because the block chain modifications transferred cryptocurrency in one set of block chain modifications (e.g., digital wallet) to another owned by the same person.

At block 470, a report of the first and second sets of block chain modifications may be generated, while excluding the first and the second block chain modifications based on them being flagged. For example, a set of taxable events and/or a value of tax liability may be generated and the first and second sets of block chain modifications may be excluded from such a report. In some embodiments, the report may include the first and second block chain modifications. For example, the report may include a set of correlated and/or suggested to be correlated block chain modifications via which a user may identify block chain modifications for which the user was associated with or otherwise owned the block chain modifications on both ends of the exchange. In some embodiments, the automatically correlated block chain modifications may be presented to the user for approval, in which case, the report may include the correlated block chain modifications that are automatically correlated and/or those predicted to be correlated such that the user may approve some or all of the correlated block chain modifications.

Modifications, additions, or omissions may be made to the method 400 without departing from the scope of the disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5:
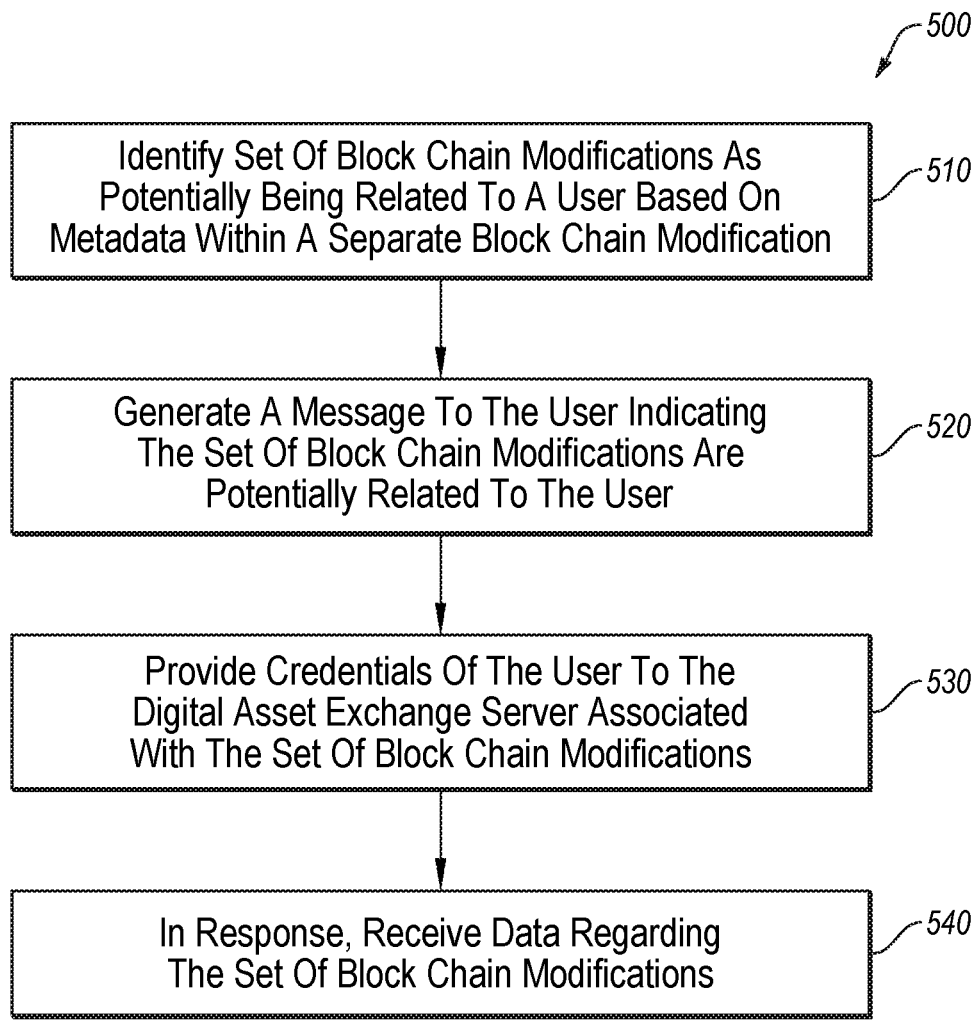
FIG. 5 illustrates an example flowchart of an example method of obtaining sets of block chain modifications.

FIG. 5 illustrates an example flowchart of an example method 500 of obtaining sets of block chain modifications, in accordance with one or more embodiments of the present disclosure. In some embodiments, the method 500 may be an example of the block 410 and/or 420 of FIG. 4 in which a set of block chain modifications may be obtained. One or more operations of the method 500 may be performed by a system or device, or combinations thereof, such as the processing system 120 of FIG. 1 and/or the computing system 800 of FIG. 8. Although illustrated as discrete blocks, various blocks of the method 500 may be divided into additional blocks, combined into fewer blocks, or eliminated, depending on the desired implementation.

At block 510, a set of block chain modifications may be identified as being potentially related to a user based on metadata within a separate block chain modification. For example, based on observing various data fields or patterns of transactions, a processing system may predict that the set of block chain modifications may be potentially related to the user. In some embodiments, the processing system may analyze a "to" or "from" field in the set of block chain modifications, and may identify one or more of the fields as being associated with the user. The entries in the "to" or "from" fields may include a resource ID identifying another set of block chain modifications (e.g., a digital wallet resource identifier internal to a digital asset exchange, a digital wallet hash identifier for a wallet outside the digital asset exchange), an email address, a digital exchange address or other identifier, etc. In some embodiments, such information may be included in other data fields, such as network information, block chain modification notes, etc. In some embodiments, the identifying information includes a new single-use wallet address that is generated for each block chain modification. The single-use wallet address may be listed as the "to" address in an outgoing block chain modification, and as the recipient address in the inbound block chain modification. By finding a common value in two block chain modifications (e.g., even across different digital asset exchanges, etc.), the corresponding and opposite block chain modification may be identified. In some embodiments, provider notes, a history of correlated block chain modifications associated with sets of block chain modifications associated with a user, or other attributes associated with the user may be used to identify or predict correlated block chain modifications. In some embodiments, a raw data file, such as CSV file, may include identifying information of the user or party who obtained the CSV file. In these and other embodiments, the associated email address may be used to identify other set of block chain modifications that may be associated with the user. In some embodiments, a user may manually identify one or more sets of block chain modifications that are associated with the user (which may include validating the user-identified association with the sets of block chain modifications).

In some embodiments, the block 510 may identify a single block chain modification as correlated with another block chain modification, even if owned or otherwise associated with a different user. In some embodiments, for corresponding block chain modifications between two different users, there may be multiple ways via which information may be conveyed to the user regarding correlated block chain modifications involving other users. For example, the processing system may intelligently identify potentially correlated block chain modifications based on both sides of the block chain modifications being accessible by the processing system despite being associated with different users (e.g., both users have uploaded or otherwise provided access for the processing system to their respective block chain modifications). As another example, when a block chain modification is provided to the processing system, the user may manually identify the owner of the corresponding block chain modification (e.g., by a user name, email address, full name, address, wallet address, etc.). If the identified user is associated with the processing system, the processing system may provide a notification to the identified user that additional data regarding the block chain modification may be available, and if the identified user and/or the identifying user approves, the correlation and other associated data as described herein may be associated with the block chain modifications. If the identified user is not associated with the processing system, the processing system may send a message (e.g., an email) to the identified user indicating that certain information regarding the block chain modification may be desirable and available for the user. In some embodiments, the information may be provided in the email (e.g., the initial acquisition price and/or cost basis, etc.), the information may be provided upon the identified user associating with the processing system (e.g., creating an account), or both.

At block 520, a message may be generated to be provided to the user indicating the set of block chain modifications are potentially related to the user. For example, the processing system may provide an email, a notification in a user interface, etc. indicating that a potential set of block chain modifications (e.g., a digital wallet) may be owned by or otherwise associated with the user. In some embodiments, before accessing the data, the user may manually approve the set of block chain modifications as being related to the user. Additionally or alternatively, the message may indicate that a potentially correlated block chain modification may be identified.

At block 530, the user may provide credentials to the digital asset exchange server hosting or otherwise associated with the set of block chain modifications (e.g., the digital wallet). For example, the user may log in to the digital asset exchange server via an API from within the processing system. As another example, the user may log in directly to the digital asset exchange server and may download the set of block chain modifications. As a further example, the user may log in directly to the digital asset exchange server and may instruct the digital asset exchange server (e.g., via a command on a graphical user interface such as an API call to the processing system) to provide the processing system with the set of block chain modifications. In some embodiments, the user may approve the potential correlation of the block chain modifications and may request that the processing system seek to acquire additional data regarding the block chain modification. For example, such data may include a transaction type, a cost basis, an original acquisition date, and/or an original acquisition price for the particular asset involved in the correlated block chain modification.

At block 540, in response to the block 530, the processing system may receive data regarding the set of block chain modifications. For example, the user may upload the downloaded file to the processing system. As another example, the processing system may receive the set of block chain modifications directly from the digital asset exchange server. As a further example, the other user associated with the correlated block chain modification may grant permission for the processing system to access the data and/or may provide the data to the processing system. In these and other embodiments, the metadata of the block chain modification with which the correlated block chain modification is correlated may be updated to reflect the additional data obtained via the predicted correlation.

Modifications, additions, or omissions may be made to the method 500 without departing from the scope of the disclosure. For example, the operations of the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6:
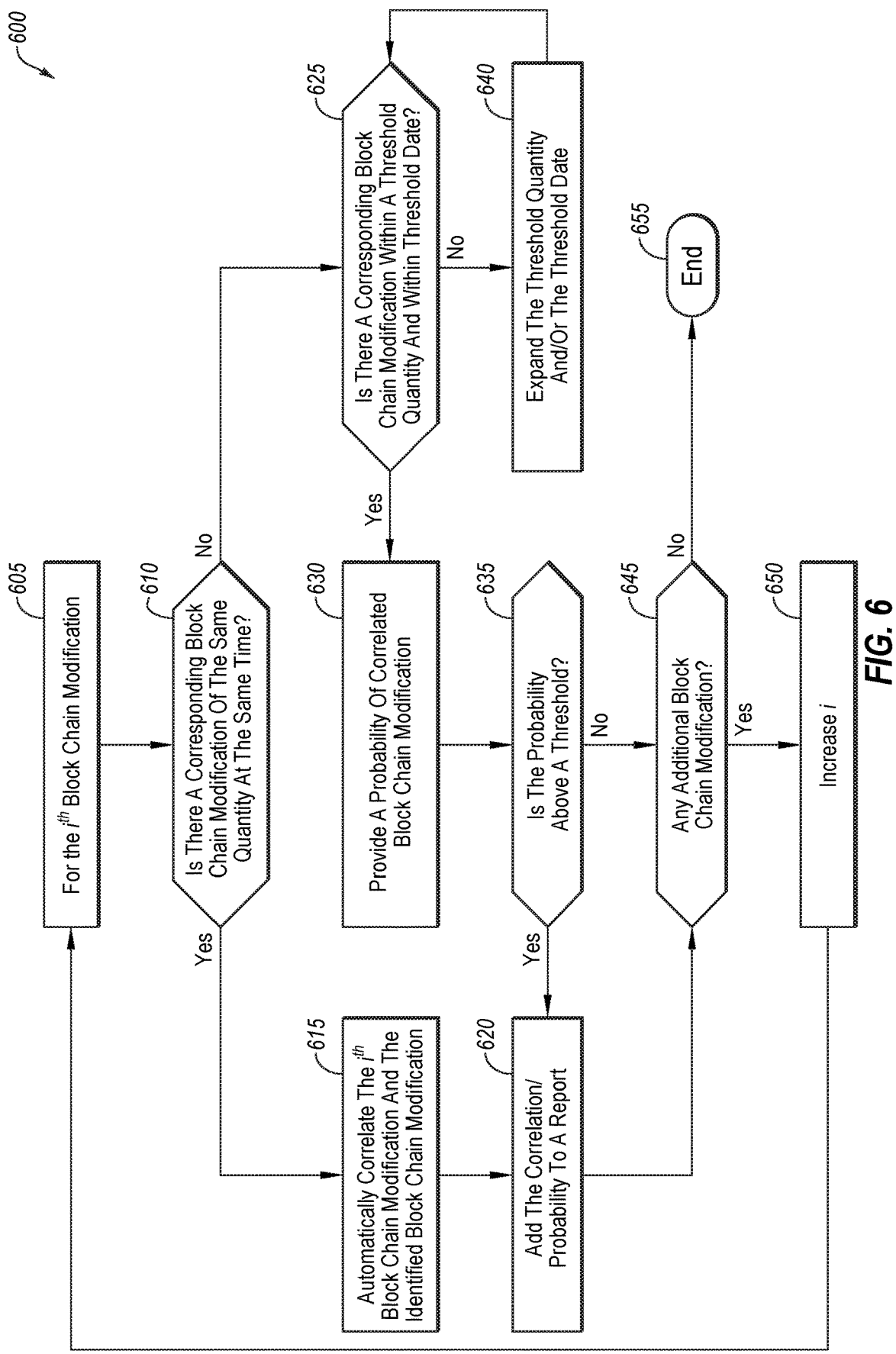
FIG. 6 illustrates an example flowchart of another example method of block chain modification correlation.

FIG. 6 illustrates an example flowchart of another example method 600 of block chain modification correlation, in accordance with one or more embodiments of the present disclosure. One or more operations of the method 600 may be performed by a system or device, or combinations thereof, such as the processing system 120 of FIG. 1 and/or the computing system 800 of FIG. 8. Although illustrated as discrete blocks, various blocks of the method 600 may be divided into additional blocks, combined into fewer blocks, or eliminated, depending on the desired implementation.

At block 605, the $i^{th}$ block chain modification may be identified, and analysis may begin for the $i^{th}$ block chain modification. In some embodiments, the method 600 may be influenced by the geographic region for which the method 600 is being performed. For example, if a set of block chain modifications is being analyzed for the United States, correlation may be based on block chain modifications including a same type of block chain modification, while in the European Union, correlation may be based on block chain modifications from one cryptocurrency to any other cryptocurrency.

At block 610, a determination may be made whether there is a corresponding block chain modification of the same amount at the same time. In some embodiments, such a corresponding block chain modification may also be analyzed to determine if it is the same type (e.g., both block chain modifications involve Ethereum or Bitcoin). In these and other embodiments, the same quantity may account for a known fee. For example, if the fee associated with a given exchange is known to be a fixed amount or a fixed percentage, the quantity of the outgoing block chain modification may be larger than the incoming block chain modification by the fee. If there is such a corresponding block chain modification, the method 600 may proceed to the block 615. If there is no such corresponding block chain modification, the method 600 may proceed to the block 625.

At block 615, the $i^{th}$ block chain modification may be automatically correlated with the identified block chain modification of the same date and same quantity. For example, the $i^{th}$ block chain modification and the identified block chain modification may be flagged as being two ends of the same exchange, both ends of which were owned or otherwise associated with the same user.

At block 620, the correlation (and or a probability that a correlation exists) may be added to a report. For example, the report may include a list of all correlations automatically generated or potential correlations that may be made. In some embodiments, the report may include a probability that the correlation is correct. After the block 620, the method may proceed to the block 645.

At block 625, a determination may be made whether a corresponding block chain modification is identified within a threshold quantity and/or within a threshold date. For example, either threshold may be within a certain absolute value, or within a percentage of the quantity and/or date. Additionally, the thresholds may be independently set and/or adjusted. If a corresponding block chain modification is identified, the method 600 may proceed to the block 630. If there is not a corresponding block chain modification identified, the method 600 may proceed to the block 640.

At block 630, a probability may be provided for whether or not the $i^{th}$ block chain modification and the block chain modification identified at block 625 are correlated. Such a probability may be based on any of a variety of factors, including for example, how close the quantity and/or date are for the two block chain modifications, whether the two block chain modifications are opposite directions (e.g., one is incoming and one is outgoing), whether the quantities match (aside from a known fee), whether multiple smaller quantities of the opposite direction match a given block chain modification (e.g., do two smaller block chain modifications correlate with one opposite larger block chain modification), whether the two block chain modifications follow a pattern observed previously for the user, etc.

At block 635, a determination may be made whether or not the probability of block 630 is above a threshold probability. In some embodiments, the threshold probability may be a low threshold (e.g., above 40%, above 50%, above 75%, etc.) such that a user may observe potential matches without excluding potential correlations. In some embodiments, the user may adjust the threshold to receive more or fewer potential correlations in the report. If the probability is above the threshold, the method 600 may proceed to the block 620 where the probability of the correlation may be added to the report. If the probability is below the threshold, the method 600 may proceed to the block 645.

At block 640, the threshold amount and/or the threshold date may be expanded and the method 600 may return to the block 625 to determine whether or not there is a corresponding block chain modification within the expanded threshold(s). In these and other embodiments, the cycle between 625 and 640 may be repeated iteratively. For example, the process may be repeated until no further block chain modifications are found or the probability of correlations has fallen below some minimum threshold.

At block 645, a determination may be made whether or not there are additional block chain modifications to be analyzed. If there are additional block chain modifications to be analyzed for correlations, the method 600 may proceed to the block 650 where i is increased and returns to the block 605 to begin the analysis for correlations for the next block chain modification. If there are no additional block chain modifications to be analyzed for correlations, the method 600 may proceed to the block 655 to end.

Modifications, additions, or omissions may be made to the method 600 without departing from the scope of the disclosure. For example, the operations of the method 600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 7:
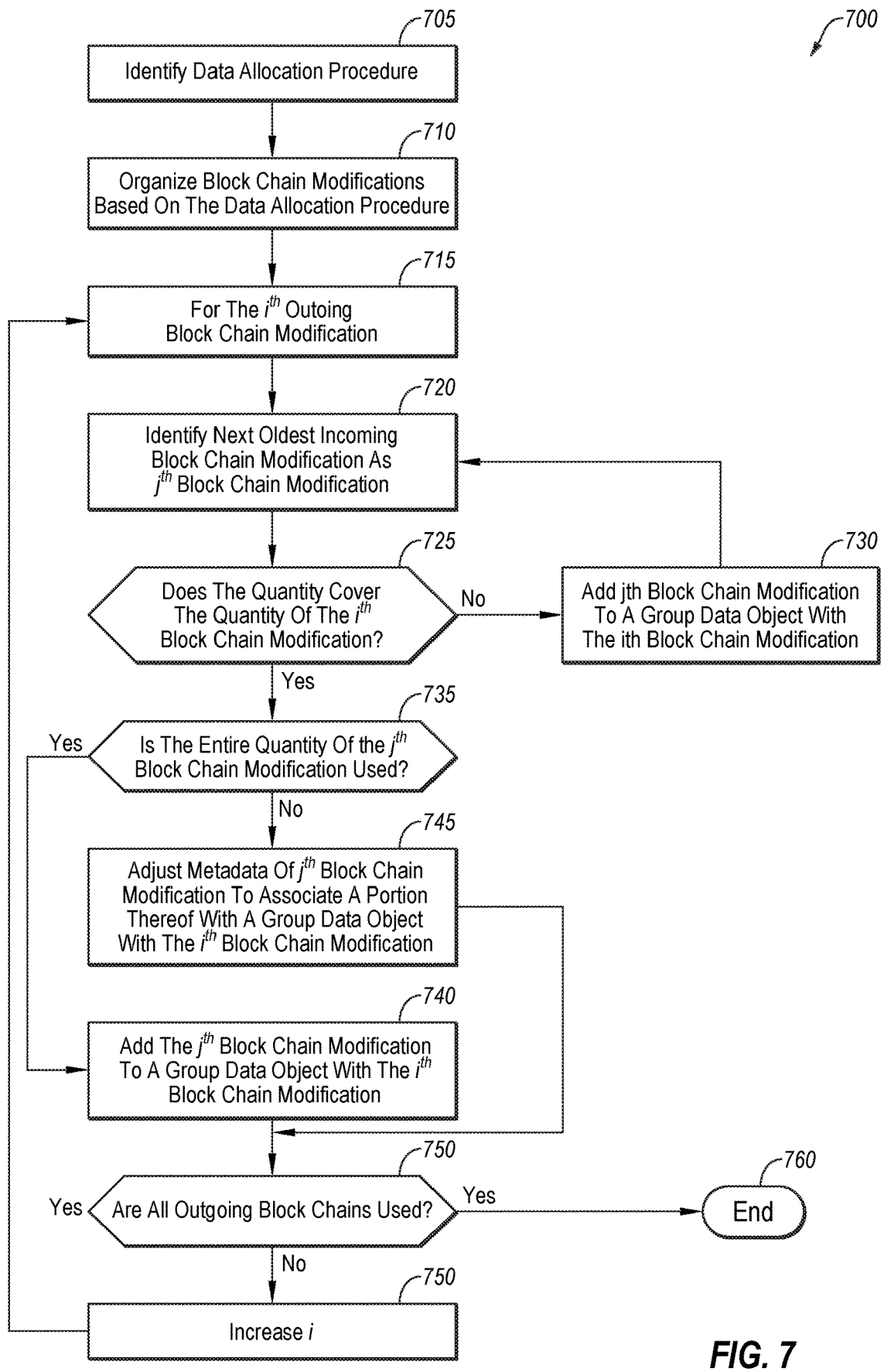
FIG. 7 illustrates an example flowchart of an example method of generating group data objects.

FIG. 7 illustrates an example flowchart of an example method 700 of generating group data objects, in accordance with one or more embodiments of the present disclosure. One or more operations of the method 700 may be performed by a system or device, or combinations thereof, such as the processing system 120 of FIG. 1 and/or the computing system 800 of FIG. 8. Although illustrated as discrete blocks, various blocks of the method 700 may be divided into additional blocks, combined into fewer blocks, or eliminated, depending on the desired implementation. In some embodiments, the method 700 may be used to determine a cost basis and/or an amount gained by holding and/or selling cryptocurrency.

At block 705, a data allocation procedure may be identified. For example, based on the geographic region for which any analyses are being performed (e.g., for the United States, for the European Union, etc.), a data allocation procedure may be used in that geographic region, such as FIFO, FILO, etc.

At block 710, block chain modifications may be organized based on the data allocation procedure. For example, if the data allocation procedure is FIFO, the outgoing and incoming block chain modifications may be organized in an oldest to newest order. As another example, if the data allocation procedure is FILO, the outgoing block chain modifications may be organized in an oldest to newest order and the incoming block chain modifications may be organized in a newest to oldest order.

At block 715, the $i^{th}$ outgoing block chain modification may be identified, and analysis may begin for the $i^{th}$ outgoing block chain modification. For example, the oldest (e.g., first in the order of oldest to newest) may be used first as the $i^{th}$ outgoing block chain modification.

At block 720, a next oldest incoming block chain modification may be identified as the $j^{th}$ incoming block chain modification.

At block 725, a determination may be made whether the quantity of the $j^{th}$ incoming block chain modification covers the quantity of the $i^{th}$ outgoing block chain modification. For example, if the $i^{th}$ outgoing block chain modification is 2.2 units, a determination may be made whether the quantity of the $j^{th}$ incoming block chain modification is 2.2 units or more. If the quantity of the $j^{th}$ incoming block chain modification does not cover the quantity of the $i^{th}$ outgoing block chain modification, the method 700 may proceed to the block 730. If the quantity of the $j^{th}$ incoming block chain modification does cover the quantity of the $i^{th}$ outgoing block chain modification, the method 700 may proceed to the block 735.

At block 730, the $j^{th}$ incoming block chain modification may be added to a group data object with the $i^{th}$ outgoing block chain modification, and the metadata of the $i^{th}$ outgoing block chain modification may be updated or otherwise modified to indicate that a quantity corresponding to the quantity of the $j^{th}$ incoming block chain modification has been covered. For example, if the $i^{th}$ outgoing block chain modification is 2.2 units and the $j^{th}$ incoming block chain modification is 1.5 units, the metadata for the $i^{th}$ outgoing block chain modification may indicate that 1.5 of the 2.2 units has been covered, leaving 0.7 units uncovered. For example, with reference to FIG. 3, the quantity of the incoming block chain modification 321 may cover part of the quantity of the outgoing block chain modification 312. After adding the $j^{th}$ incoming block chain modification to the group data object, the method 700 may return to the block 720 to identify the next oldest incoming block chain modification, e.g., by increasing j by one, such that the next incoming block chain modification may be used to further cover the $i^{th}$ outgoing block chain modification.

At block 735, a determination may be made of whether the entire quantity of the $j^{th}$ incoming block chain modification has been used to cover outgoing block chain modifications. If the entire quantity of the $j^{th}$ incoming block chain modification has been used to cover outgoing block chain modifications, the method 700 may proceed to the block 740. If the entire quantity of the $j^{th}$ incoming block chain modification has not been used to cover outgoing block chain modifications, the method 700 may proceed to the block 745.

At block 740, the $j^{th}$ incoming block chain modification may be added to a group data object with the $i^{th}$ outgoing block chain modification.

At block 745, the metadata of the $j^{th}$ incoming block chain modification chain may be adjusted or otherwise modified to indicate that a quantity corresponding to the remaining quantity of the $i^{th}$ outgoing block chain modification has been covered. For example, if the $i^{th}$ outgoing block chain modification is 0.7 units remaining and the $j^{th}$ incoming block chain modification is 1.5 units, the metadata for the $j^{th}$ incoming block chain modification may indicate that 0.7 units of the 1.5 units has been used to cover outgoing block chain modifications, leaving 0.8 units to be used to cover additional outgoing block chain modifications. For example, with reference to FIG. 3, the quantity of the incoming block chain modification 326 may cover all or part of the quantity of the outgoing block chain modification 316 while having a remainder left below the separator 332.

At block 750, a determination may be made whether all outgoing block chain modifications have been used for analysis. If there are additional outgoing block chain modifications to be analyzed to be covered by the generation of group data objects, the method 700 may proceed to the block 755 where i is increased and returns to the block 715 to begin the analysis for correlations for the next block chain modification. If there are no additional outgoing block chain modifications to be analyzed, the method 700 may proceed to the block 760 to end.

At the conclusion of the method 700, the group data objects may be used to determine an amount gained or lost by holding and/or selling cryptocurrency. For example, by creating the group data objects, the outgoing block chain modifications may be grouped with the incoming block chain modifications that cover it. In these and other embodiments, by comparing a value of the incoming block chain modifications when they came in (as determined by either a metadata field of the incoming block chain modification or the date of the incoming block chain modification compared with a database of exchange rates for that given date) with the value of the incoming block chain modifications at the date of the outgoing block chain modification, the amount gained or lost may be determined. In these and other embodiments, portions of a single incoming block chain modification may be subject to different rates of gain if the single incoming block chain modification is split between covering two (or more) outgoing block chain modifications at times with different exchange rates. In some embodiments, the amount gained or lost for the incoming block chain modifications may be provided in a report or otherwise provided to a user.

In some embodiments, the amount gained or lost may be based on acquisition data and/or the exchange rate or price of the associated asset at the time of acquisition. For example, if one of the assets involved was a gift, the cost basis may be based on an original acquisition event, rather than simply when the incoming block chain modification occurred. In these and other embodiments, the metadata for the incoming block chain modification (and potentially other block chain modifications correlated with the incoming block chain modification) may be observed to trace back to an original acquisition event. For example, if an initial incoming block chain modification for a first user was an acquisition of a digital asset for a certain price, and that digital asset was gifted to a second user, then donated to a third user, who provided it to a fourth user via an incoming block chain modification at a later point in time, the determination of gain or loss may be based on the initial incoming block chain modification and the associated certain price. In these and other embodiments, by correlating each of the block chain modifications along the way, and/or requesting access to the data to obtain the initial acquisition price, quantity, etc. of each of the block chain modifications along the way, the initial acquisition event may be used to determine the amount gained or lost.

In some embodiments, the report generated after the method 700, and/or the method 700 itself may exclude certain correlated block chain modifications, such as those correlated according to the process described with reference to method 600 of FIG. 6. For example, if determining gains or losses for taxation purposes or for other obligations, a block chain modification of one cryptocurrency to the same cryptocurrency stored in another location may not qualify as a taxable event in certain jurisdictions, and as such, may be excluded from the method 700 based on the correlation of the method 600. As another example, in some jurisdictions the transition from any cryptocurrency to any other cryptocurrency is not considered a taxable event, and so those block chain modifications as correlated according to the method 600 may be excluded from the method 700.

Modifications, additions, or omissions may be made to the method 700 without departing from the scope of the disclosure. For example, the operations of the method 700 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 8:
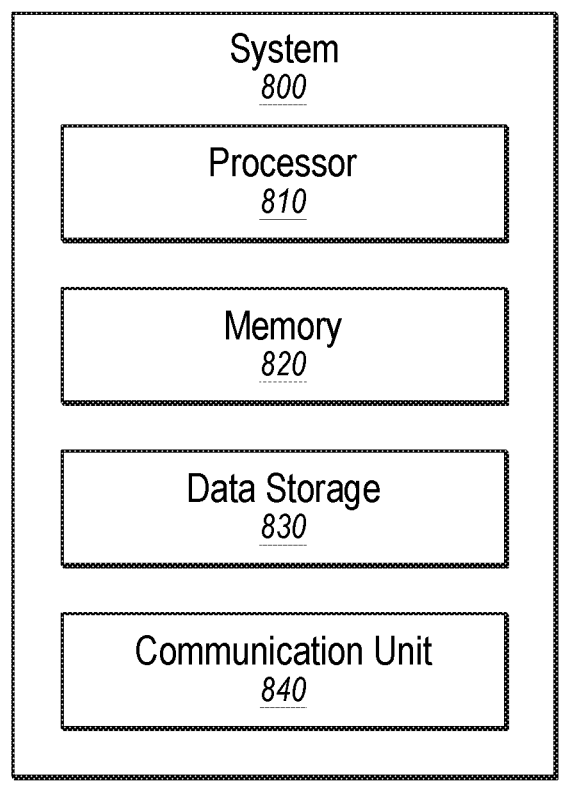
FIG. 8 illustrates an example computing system.

FIG. 8 illustrates an example computing system 800 to facilitate block chain modification correlation, according to at least one embodiment described in the present disclosure. The computing system 800 may include a processor 810, a memory 820, a data storage 830, and/or a communication unit 840, which all may be communicatively coupled. Any or all of the processing system 110, digital asset exchanges 140, etc. of FIG. 1 may be implemented by a computing system consistent with the computing system 800. Additionally or alternatively, any of the operations of the methods 400, 500, 600 and/or 700 of FIGS. 3-7 may be performed by a computing system consistent with the computing system 800. For example, the computing system 800 may obtain block chain modifications, predict the probability of correlation of such block chain modifications based on date and/or quantity, and generate a report according to such prediction.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions, such as instructions to perform any of the methods 400, 500, 600, and/or 700 of FIGS. 4-7, respectively. For example, the processor 810 may obtain instructions regarding correlation of block chain modifications.

The memory 820 and the data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 810. In some embodiments, the computing system 800 may or may not include either of the memory 820 and the data storage 830. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 840 may include any component, device, system, or combination thereof that is configured to transmit or receive information over a network. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 840 may permit data to be exchanged with a network and/or any other devices or systems described in the present disclosure. For example, the communication unit 840 may allow the system 800 to communicate with other systems, such as computing devices and/or other networks.

One skilled in the art, after reviewing this disclosure, may recognize that modifications, additions, or omissions may be made to the system 800 without departing from the scope of the present disclosure. For example, the system 800 may include more or fewer components than those explicitly illustrated and described.

As used herein, the term "block chain modification" is understood to be an expansive term covering any exchange of a quantity of an asset that could be recorded to the block chain. In some circumstances, such exchanges may be recorded on the block chain (e.g., when a user sends a cryptocurrency asset from one digital asset exchange (such as Coinbase) to another digital asset exchange (such as Kraken)). In some circumstances, such exchanges may not actually be recorded on the block chain (e.g., when assets are exchanged from one entity to another within the same digital asset exchange (such as from one wallet to another wallet within Coinbase)), but may still be considered a "block chain modification" as the exchange could be recorded to the block chain (e.g., if the exchange were to a wallet on Kraken rather than Coinbase, the exchange would be recorded on the block chain).

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific intent that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   obtaining a first set of block chain modifications related to a first user from a first digital asset exchange server, at least portions of the first set of block chain modifications accessible via credentials of the first user;
   obtaining a second set of block chain modifications related to the first user from a second digital asset exchange server, at least portions of the second set of block chain modifications accessible via the credentials of the first user;
   parsing the first set of block chain modifications and the second set of block chain modifications to identify attributes associated with a first block chain modification included in the first set of block chain modifications;
   automatically correlating the first block chain modification with a second block chain modification included in the second set of block chain modifications as corresponding components of an exchange involving the first digital asset exchange and the second digital asset exchange associated with the first user based on the attributes of at least the first block chain modification, comprising:
   beginning with the first block chain modification as an outgoing block chain modification, searching for incoming block chain modifications of a same quantity or a quantity within a first threshold quantity of the first block chain modification, and a same date or a date within a second threshold date of the first block chain modification;
   based on the search for the incoming block chain modifications of the same quantity or the quantity within the first threshold yielding no results, iteratively expanding one or both of the first threshold and the second threshold to facilitate searching for incoming block chain modifications within the first threshold quantity of the first block chain modification and within the second threshold date and time of the first block chain modification; and
   identifying the second block chain modification during the searching facilitated by the iteratively expanding as correlated with the first block chain modification;
   flagging both the first block chain modification and the second block chain modification based on the automatic correlation; and
   generating a report of the first set of block chain modifications and the second set of block chain modifications that excludes the first block chain modification and the second block chain modification based on the first block chain modification and the second block chain modification being flagged as both being associated with the exchange associated with the first user.

2. The method of claim 1, further comprising:
   predicting an additional attribute of the first block chain modification based on historical data obtained from sources other than the first digital asset exchange server;

wherein the first block chain modification is automatically correlated with the second block chain modification based on the predicted additional attribute of the first block chain modification.

3. The method of claim 1, wherein obtaining the second set of block chain modifications comprises:
identifying the second set of block chain modifications as potentially being related to the first user based on metadata associated with block chain modifications within the first set of block chain modifications;
generating a message to the first user indicating that the second set of block chain modifications is potentially related to the first user; and
receiving the second set of block chain modifications from the second digital asset exchange server based on the first user providing credentials to the second digital asset exchange server.

4. The method of claim 1, wherein generating the report includes:
identifying a data allocation procedure to be used based on geographical location;
according to the data allocation procedure, organizing the first set of block chain modifications and the second set of block chain modifications from oldest to newest;
selecting a first outgoing block chain modification of a first quantity that occurred at a first time;
identifying a first incoming block chain modification as a next oldest incoming block chain modification;
determining a quantity of the first incoming block chain modification relative to the first outgoing block chain modification;
based on the quantity of the first incoming block chain modification being smaller than the first outgoing block chain modification, identifying a second incoming block chain modification as the next oldest incoming block chain modification;
determining a quantity of the second incoming block chain modification in combination with the quantity of the first incoming block chain modification relative to the first outgoing block chain modification; and
based on the quantity of the second incoming block chain modification in combination with the quantity of the first incoming block chain modification being larger than the quantity of the first outgoing block chain modification, generating a group data object including the first outgoing block chain modification, the first incoming block chain modification, and the second incoming block chain modification;
wherein the report includes the group data object.

5. The method of claim 4, wherein the first incoming block chain modification is variable in quantity over time and the determining the quantity of the first incoming block chain modification relative to the first outgoing block chain modification is based on the quantity of the first incoming block chain modification at the first time of the first outgoing block chain modification, and the group data object further includes the quantity of the first incoming block chain modification when the first incoming block chain modification was initially received.

6. The method of claim 4, further comprising:
selecting a second outgoing block chain modification of a second quantity that occurred at a second time, the second outgoing block chain modification being next in the oldest to newest data ordering;
identifying a third incoming block chain modification as a next oldest incoming block chain modification;
determining a quantity of the third incoming block chain modification relative to the second outgoing block chain modification;
based on the quantity of the third incoming block chain modification being larger than the second outgoing block chain modification, generating a second group data object including the second outgoing block chain modification and the third incoming block chain modification; and
adjusting metadata associated with the third incoming block chain modification such that a portion of the quantity of the third incoming block chain modification is correlated with the second outgoing block chain modification in the second group data object and a remainder of the quantity of the third incoming block chain modification is correlated with a later outgoing block chain modification in a later group data object.

7. One or more non-transitory computer-readable media containing instructions that, when executed by one or more processors, cause a system to perform operations comprising:
obtaining a first set of block chain modifications related to a first user from a first digital asset exchange server, at least portions of the first set of block chain modifications accessible via credentials of the first user;
obtaining a second set of block chain modifications related to the first user from a second digital asset exchange server, at least portions of the second set of block chain modifications accessible via the credentials of the first user;
parsing the first set of block chain modifications and the second set of block chain modifications to identify attributes associated with a first block chain modification included in the first set of block chain modifications;
automatically correlating the first block chain modification with a second block chain modification included in the second set of block chain modifications as corresponding components of an exchange involving the first digital asset exchange and the second digital asset exchange associated with the first user based on the attributes of at least the first block chain modification, comprising:
beginning with the first block chain modification as an outgoing block chain modification, searching for incoming block chain modifications of a same quantity or a quantity within a first threshold quantity of the first block chain modification, and a same date or a date within a second threshold date of the first block chain modification;
based on the search for the incoming block chain modifications of the same quantity or the quantity within the first threshold yielding no results, iteratively expanding one or both of the first threshold and the second threshold to facilitate searching for incoming block chain modifications within the first threshold quantity of the first block chain modification and within the second threshold date and time of the first block chain modification; and
identifying the second block chain modification during the searching facilitated by the iteratively expanding as correlated with the first block chain modification;
flagging both the first block chain modification and the second block chain modification based on the automatic correlation; and
generating a report of the first set of block chain modifications and the second set of block chain modifications that excludes the first block chain modification and the second block chain modification based on the first block chain modification and the second block chain modification being flagged as both being associated with the exchange associated with the first user.

8. The non-transitory computer-readable media of claim 7, wherein the operations further comprise:
predicting an additional attribute of the first block chain modification based on historical data obtained from sources other than the first digital asset exchange server;
wherein the first block chain modification is automatically correlated with the second block chain modification based on the predicted additional attribute of the first block chain modification.

9. The non-transitory computer-readable media of claim 7, wherein obtaining the second set of block chain modifications comprises:
identifying the second set of block chain modifications as potentially being related to the first user based on metadata associated with block chain modifications within the first set of block chain modifications;
generating a message to the first user indicating that the second set of block chain modifications is potentially related to the first user; and
receiving the second set of block chain modifications from the second digital asset exchange server based on the first user providing credentials to the second digital asset exchange server.

10. The non-transitory computer-readable media of claim 7, wherein generating the report includes:
identifying a data allocation procedure to be used based on geographical location;
according to the data allocation procedure, organizing the first set of block chain modifications and the second set of block chain modifications from oldest to newest;
selecting a first outgoing block chain modification of a first quantity that occurred at a first time;
identifying a first incoming block chain modification as a next oldest incoming block chain modification;
determining a quantity of the first incoming block chain modification relative to the first outgoing block chain modification;
based on the quantity of the first incoming block chain modification being smaller than the first outgoing block chain modification, identifying a second incoming block chain modification as the next oldest incoming block chain modification;
determining a quantity of the second incoming block chain modification in combination with the quantity of the first incoming block chain modification relative to the first outgoing block chain modification; and
based on the quantity of the second incoming block chain modification in combination with the quantity of the first incoming block chain modification being larger than the quantity of the first outgoing block chain modification, generating a group data object including the first outgoing block chain modification, the first incoming block chain modification, and the second incoming block chain modification;
wherein the report includes the group data object.

11. The non-transitory computer-readable media of claim 10, wherein the first incoming block chain modification is variable in quantity over time and the determining the quantity of the first incoming block chain modification relative to the first outgoing block chain modification is based on the quantity of the first incoming block chain modification at the first time of the first outgoing block chain modification, and the group data object further includes the quantity of the first incoming block chain modification when the first incoming block chain modification was initially received.

12. The non-transitory computer-readable media of claim 7 wherein the operations further comprise:
selecting a second outgoing block chain modification of a second quantity that occurred at a second time, the second outgoing block chain modification being next in the oldest to newest data ordering;
identifying a third incoming block chain modification as a next oldest incoming block chain modification;
determining a quantity of the third incoming block chain modification relative to the second outgoing block chain modification;
based on the quantity of the third incoming block chain modification being larger than the second outgoing block chain modification, generating a second group data object including the second outgoing block chain modification and the third incoming block chain modification; and
adjusting metadata associated with the third incoming block chain modification such that a portion of the quantity of the third incoming block chain modification is correlated with the second outgoing block chain modification in the second group data object and a remainder of the quantity of the third incoming block chain modification is correlated with a later outgoing block chain modification in a later group data object.

13. A system comprising:
one or more processors;
one or more non-transitory computer-readable media containing instructions that, when executed by the one or more processors, cause the system to perform operations comprising:
obtaining a first set of block chain modifications related to a first user from a first digital asset exchange server, at least portions of the first set of block chain modifications accessible via credentials of the first user;
obtaining a second set of block chain modifications related to the first user from a second digital asset exchange server, at least portions of the second set of block chain modifications accessible via the credentials of the first user;
parsing the first set of block chain modifications and the second set of block chain modifications to identify attributes associated with a first block chain modification included in the first set of block chain modifications;
automatically correlating the first block chain modification with a second block chain modification included in the second set of block chain modifications as corresponding components of an exchange involving the first digital asset exchange and the second digital asset exchange associated with the first user based on the attributes of at least the first block chain modification, comprising:
beginning with the first block chain modification as an outgoing block chain modification, searching for incoming block chain modifications of a same quantity or a quantity within a first threshold quantity of the first block chain modification, and a same date or a date within a second threshold date of the first block chain modification;

based on the search for the incoming block chain modifications of the same quantity or the quantity within the first threshold yielding no results, iteratively expanding one or both of the first threshold and the second threshold to facilitate searching for incoming block chain modifications within the first threshold quantity of the first block chain modification and within the second threshold date and time of the first block chain modification; and identifying the second block chain modification during the searching facilitated by the iteratively expanding as correlated with the first block chain modification;

flagging both the first block chain modification and the second block chain modification based on the automatic correlation; and generating a report of the first set of block chain modifications and the second set of block chain modifications that excludes the first block chain modification and the second block chain modification based on the first block chain modification and the second block chain modification being flagged as both being associated with the exchange associated with the first user.

14. The system of claim 13, wherein the operations further comprise:

predicting an additional attribute of the first block chain modification based on historical data obtained from sources other than the first digital asset exchange server;

wherein the first block chain modification is automatically correlated with the second block chain modification based on the predicted additional attribute of the first block chain modification.

15. The system of claim 13, wherein obtaining the second set of block chain modifications comprises:

identifying the second set of block chain modifications as potentially being related to the first user based on metadata associated with block chain modifications within the first set of block chain modifications;

generating a message to the first user indicating that the second set of block chain modifications is potentially related to the first user; and receiving the second set of block chain modifications from the second digital asset exchange server based on the first user providing credentials to the second digital asset exchange server.

16. The system of claim 13, wherein generating the report includes:

identifying a data allocation procedure to be used based on geographical location;

according to the data allocation procedure, organizing the first set of block chain modifications and the second set of block chain modifications from oldest to newest;

selecting a first outgoing block chain modification of a first quantity that occurred at a first time;

identifying a first incoming block chain modification as a next oldest incoming block chain modification;

determining a quantity of the first incoming block chain modification relative to the first outgoing block chain modification;

based on the quantity of the first incoming block chain modification being smaller than the first outgoing block chain modification, identifying a second incoming block chain modification as the next oldest incoming block chain modification;

determining a quantity of the second incoming block chain modification in combination with the quantity of the first incoming block chain modification relative to the first outgoing block chain modification; and based on the quantity of the second incoming block chain modification in combination with the quantity of the first incoming block chain modification being larger than the quantity of the first outgoing block chain modification, generating a group data object including the first outgoing block chain modification, the first incoming block chain modification, and the second incoming block chain modification;

wherein the report includes the group data object.

17. The system of claim 16, wherein the first incoming block chain modification is variable in quantity over time and the determining the quantity of the first incoming block chain modification relative to the first outgoing block chain modification is based on the quantity of the first incoming block chain modification at the first time of the first outgoing block chain modification, and the group data object further includes the quantity of the first incoming block chain modification when the first incoming block chain modification was initially received.

* * * * *